United States Patent [19]
Yacoub et al.

[11] Patent Number: 5,761,392
[45] Date of Patent: Jun. 2, 1998

[54] PROCESS OF MAKING TWO ADJACENT UNIFORMLY COLORED OBJECTS APPEAR WITH A DIMINISHED GAP IN BETWEEN

[75] Inventors: Yousef Yacoub, San Jose; Allen M. Chan, Sunnyvale, both of Calif.

[73] Assignee: Apple Computer, Inc., Cupertino, Calif.

[21] Appl. No.: 473,280

[22] Filed: Jun. 6, 1995

[51] Int. Cl.$^6$ .................. G06F 15/00; G03F 3/08; H04N 1/40; G06K 9/40

[52] U.S. Cl. .................. 395/109; 395/129; 395/131; 395/132; 358/518; 358/447; 382/254; 382/199; 382/256; 382/266; 382/268

[58] Field of Search .................. 395/109, 129, 395/131, 132; 358/515, 518, 447, 537, 520; 346/157; 382/254, 199, 256, 266, 268; 348/625

[56] References Cited

U.S. PATENT DOCUMENTS

| | | | |
|---|---|---|---|
| 4,335,407 | 6/1982 | Atoji et al. | 358/447 |
| 4,581,631 | 4/1986 | Sonnenberger | 348/625 |
| 5,140,315 | 8/1992 | Edelson et al. | 340/728 |
| 5,153,748 | 10/1992 | Moyer | 358/443 |
| 5,260,695 | 11/1993 | Gengler et al. | 345/153 |
| 5,386,223 | 1/1995 | Saitoh et al. | 358/528 |
| 5,544,291 | 8/1996 | Gilley et al. | 395/123 |

FOREIGN PATENT DOCUMENTS

| | | | |
|---|---|---|---|
| 3223894 | 2/1991 | Japan | G09G 5/06 |

OTHER PUBLICATIONS

Dr. R.K. Molla; "Electronic Color Separation"; 1988; pp. 230–232.

*Primary Examiner*—Edward L. Coles, Sr.
*Assistant Examiner*—Tia M. Harris
*Attorney, Agent, or Firm*—Burns, Doane, Swecker & Mathis, L.L.P.

[57] ABSTRACT

A process is provided for avoiding a gap between adjacent uniform color objects in an image. First, it is first determined whether the image data contains two adjacent uniform color objects, each uniform color composed of two or fewer characteristic color components, and whether a gap would be evident between the uniform color objects. If the image data does not contain two adjacent uniform color objects with two or fewer characteristic color components or if a gap would not be evident, the image data is processed and output without adjusting the image. If, alternatively, it is determined that the image data contains two adjacent uniform color objects with two or fewer characteristic color components and a gap would be evident, at least one of the objects is examined to determine the saturation of each characteristic color component. Once the saturation of each color component is determined, small percentages of the total saturation of each characteristic color component are added together to form a light gray component of the same color as the examined color object. Next, the light gray component is added as a border around the edges of the adjacent color objects. Then, the image data is processed and output.

19 Claims, 4 Drawing Sheets

5,761,392

PROCESS OF MAKING TWO ADJACENT UNIFORMLY COLORED OBJECTS APPEAR WITH A DIMINISHED GAP IN BETWEEN

FIELD OF THE INVENTION

The present invention relates to color imaging systems, and more particularly to a process for producing an image with two adjacent uniformly colored objects without a gap therebetween.

BACKGROUND

Color output devices for color imaging systems, such as color printers, typically represent colors within the context of a device color space. A color space reflects the particular characteristics of the manner in which a device produces a color image. Generally, color printers define colors in terms of a CMYK (cyan-magenta-yellow-black) color space, since they generate color images by means of cyan, magenta, yellow and black inks or toners.

A color which is specified in a particular color space is made up of individual components characteristic of that color space. The color blue, for example, may be represented in the CMYK color space as a combination of cyan and magenta. The intensity with which each component in a color space is displayed on a medium, e.g. the density of ink on a paper, is expressed as a percentage of saturation. Thus, for example, 100% blue in the CMYK color space comprises 100% cyan saturation and 100% magenta saturation.

In a conventional printer, output images comprise a two-dimensional grid of picture elements, or pixels, that is known as a "raster". To produce an image on a page, toner is placed on a paper in positions corresponding to a pixel map. The pixel map is a representation in memory of a display value for each pixel in the object or text. Due to electophotography processing within the printer, the positions at which toner is placed on a paper may not exactly correspond to the pixel map. This problem is compounded when printing different color objects, since toner is applied at separate passes of the printing drum. Thus, when a color object is printed adjacent to a differently colored object, the edges of the two objects may not be exactly aligned, and a gap may appear between the two objects.

Examples of this problem are illustrated in FIGS. 1A, 1B and 1C. In FIGS. 1A-1C, different uniform colors are represented by black and checkered patterns. FIG. 1A shows a gap that appears between two adjacent objects of different colors. FIG. 1B shows a gap that appears between text of one color and a background of a different color. FIG. 1C shows a gap that appears between overlapping objects of different colors. The gaps in FIGS. 1A-1C have been greatly exaggerated for the purposes of illustration. Normally, gaps that appear between two adjacent objects of different color are not as wide. Also, the gaps may not be uniform around the objects, e.g. the gap may appear only on the top, side or bottom edges of the objects.

The gap between adjacent objects of different colors is particularly evident between contrasting colors that are composed of one or two colors characteristic of a color space. For example, in a CMYK color space, a gap is readily apparent between objects of the colors cyan, magenta, yellow, and black. A gap is also readily apparent between objects of the colors red, green, and blue, which are composed respectively of magenta and yellow, cyan and yellow, and cyan and magenta. Thus, the appearance of a gap between color objects is particularly a problem between adjacent uniform color objects.

Various attempts have been made to reduce the appearance of the "gap" between uniform color objects. One attempt, "plane to plane registration", involves mechanically adjusting the color planes so that the edges of the uniform colors are aligned. Another approach uses software to physically "grow" one or both of the objects so that they overlap. This approach, called "trapping" reduces the gap between the objects, but changes the size of one or both of the objects. A problem with both of these approaches is that it is difficult to align the edges of the adjacent uniform color objects without overlapping them.

SUMMARY

The present invention provides a process for diminishing the effects of a gap in between adjacent uniform color objects in an image. According to the present invention, it is first determined whether the image data contains two adjacent uniform color objects, each uniform color composed of two or fewer characteristic color components, and whether a gap would be evident between the uniform color objects. If the image data does not contain two adjacent uniform color objects with two or fewer characteristic color components or a gap would not be evident, the image data is processed and output without adjusting the image. If, alternatively, it is determined that the image data contains two adjacent uniform color objects with two or fewer characteristic color components, one of the objects is examined to determine the saturation of each characteristic color component. Once the saturation of each characteristic color component is determined, small percentages of the total saturation of each characteristic color component are added together to form a light gray component, i.e. a lighter shade, of the same color as the examined color object. Next, the light gray component is added as a border around the edges of one or both of the adjacent color objects. Then, the image data is processed and output.

DETAILED DESCRIPTION

To facilitate an understanding of the present invention, it is described hereinafter in the context of a specific embodiment. In particular, reference is made to the implementation of the invention in a color printer which employs a CMYK color space to represent colors. It will be appreciated, however, that the practical applications of the invention are not limited to this particular embodiment.

Figure 2:
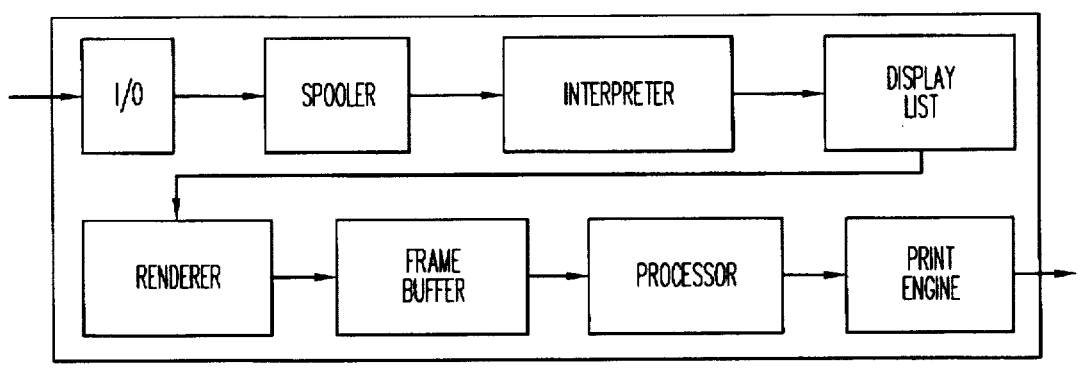
FIG. 2 depicts the major components of color printer in which the present invention may be employed.

FIG. 2 depicts the major components of a color printer in which the present invention may be employed. The printer 10 includes an I/O controller 12 connected to one or more I/O ports for communication with computers and other external sources of data to be printed. A spooler 14 accumulates image data received from the external sources, and stores the data until it is ready to be processed for printing. Alternatively, the spooler can be incorporated in an external device rather than the printer itself. An interpreter 16 receives the image and issues calls which cause the desired image to be drawn, or printed, on the paper. These calls can be of two basic types. One set of calls identifies the appearance state of objects to be drawn. This appearance state indicates the color of the object, as well as other appearance-related factors, such as patterns or the like. The other set of calls describes the object to be drawn, such as a rectangle, a particular character of text, or the like. In FIG. 2, these calls are stored in an intermediate form, known as a display list 18, or a metafile.

The information on the display list is provided to a renderer 20. The renderer converts the object-based information from the interpreter 16 into individual pixel display values, which are stored in a frame buffer 22. The pixel display values stored in the frame buffer can undergo optional processing within one or more processors 24. For example, the display values can be compressed and/or decompressed, or undergo half tone processing. Ultimately, these display values are supplied to a print engine 26, to control the actual printing of the desired image. For example, the print engine could be of the laser beam printer type. Alternatively, the print engine could be of the ink jet type.

Figure 3:
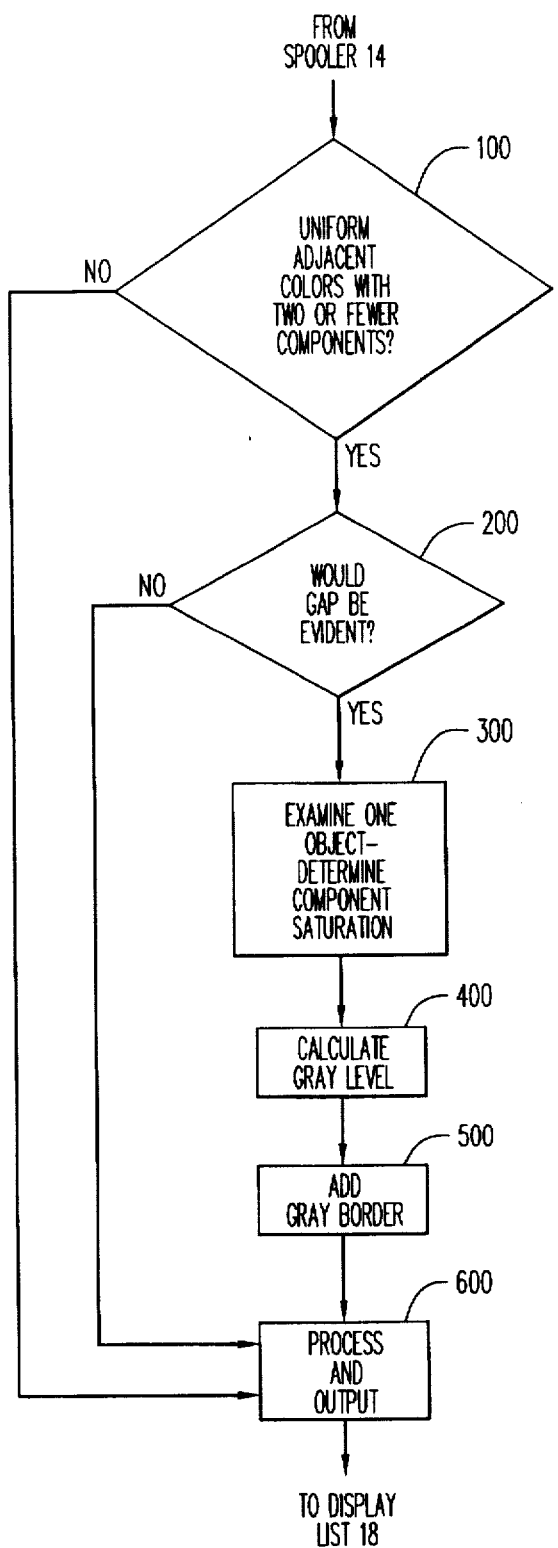
FIG. 3 depicts a process for avoiding a gap between adjacent uniform colors according to the present invention.

FIG. 3 depicts a process for avoiding a gap between adjacent uniform colors according to the present invention, which may be implemented, for example, in the interpreter 16. Referring to FIG. 3, image data from spooler 14 is received, and it is determined at step 100 whether the image data contains two adjacent uniform color objects, each uniform color composed of two or fewer characteristic color components. If the image data does not contain two adjacent uniform color objects with two or fewer characteristic color components, it is processed and output at step 600 to the display list 18.

If it is determined at step 100 that the image data contains two adjacent uniform color objects with two or fewer characteristic color components, it is next determined empirically at step 200 whether the uniform colors of the objects are colors between which a gap would be evident. For example, a gap is less evident between non-contrasting colors, such as red and magenta, or between a light color, such as yellow, and another color. If it is determined at step 200 that a gap would not be evident between the uniform color objects, the image data is processed and output at step 600 to display list 18.

If it is determined at step 200 that a gap would be evident between the uniform color objects, one of the objects is examined at step 300 to determine the saturation of each characteristic color component. Once the saturation of each characteristic color component is determined, a light gray component of the same color as the examined object is calculated by adding together small percentages, e.g. up to 30%, of the total saturation of each characteristic color component at step 400. In this context, "light gray" means a light shade of a color, e.g. a light gray component of the same color as red would be pink.

Next, at step 500, the light gray component is added as a border around the edges of the adjacent color objects. The size of the border may be slightly larger than the gap, e.g. if the gap is three pixels wide, the border added may be six pixels wide. Then, at step 600, the image data is processed and output to display list 18.

For example, assume the image data input from spooler 14 contains two adjacent color objects, one 85% saturated blue and one 85% saturated red. Applying the process described above, it is determined at step 100 that there are two adjacent uniform color objects, and each uniform color is composed of two characteristic color components. That is, the blue color is composed of cyan and magenta, and the red color is composed of magenta and yellow. Next, at step 200, it is determined that a gap would be evident between the uniform colors red and blue, since these colors are dark contrasting colors. Then, at step 300, the interpreter 16 examines one of the objects, e.g. the blue object, and determines that it is composed of 85% saturated cyan and 85% saturated magenta. At step 400, a light gray component is calculated as 10% of 85% saturated cyan, or 8.5% cyan, and 10% of 85% saturated magenta, or 8.5% magenta. Then, at step 500, a border of 8.5% saturated cyan and 8.5% saturated magenta is added around both of the objects. Finally, at step 600, the image data is processed and output to display list 18.

In the process described above, for simplicity of illustration, only one object is examined at step 300 to determine its characteristic color components. Alternatively, both adjacent objects may be examined to determine their characteristic color components. Thus, at step 400 a light gray component may be calculated according to the saturation of characteristic color components in both of the objects. The resulting light gray component would include lighter shades of the color components in both of the objects, and adding this light gray component as a border around the objects would stabilize the edges of the objects.

Figure 1A:
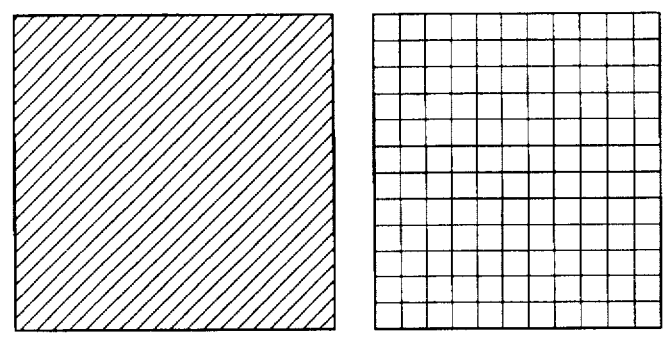
FIGS. 1A-1C depict the gap present between adjacent uniform colors printed by a conventional printer.
Figure 1B:
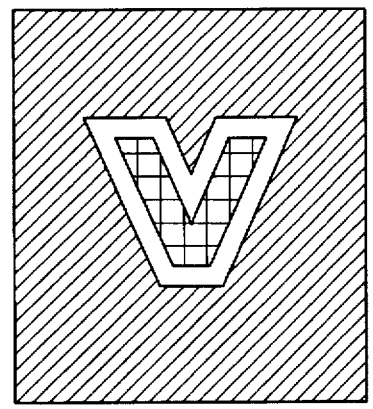
Figure 1C:
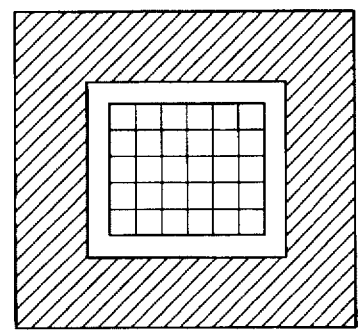
Figure 4A:
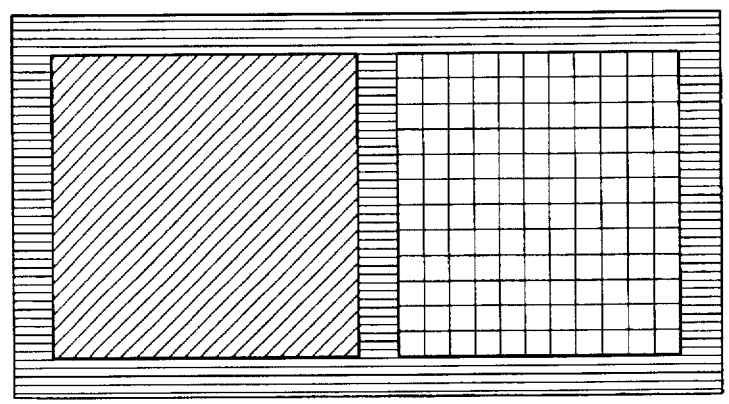
FIGS. 4A-4C depict examples of applications of the process according to the present invention.
Figure 4B:
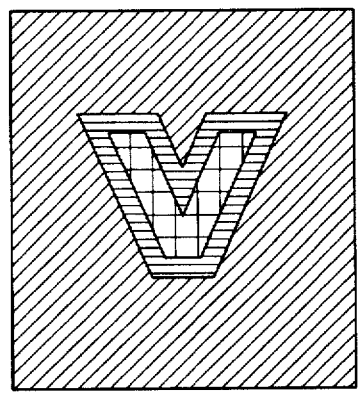
Figure 4C:
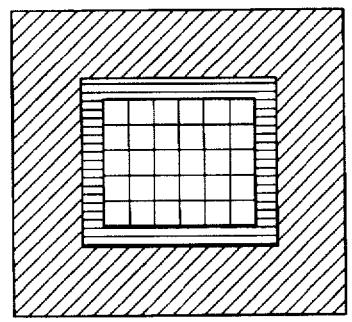

FIGS. 4A–4C depict applications of the process according to the present invention, to avoid the problems of the prior art represented in FIGS. 1A–1C. In FIGS. 4A–4C, uniform colors are represented by black and checkered patterns, and light gray is represented by striped lines.

FIG. 4A depicts an application of the process to avoid a gap between adjacent objects of different colors. In FIG. 4A, the gap between two adjacent uniform color objects is avoided by applying a light gray border around the edges of the adjacent objects, as represented by the striped lines. Alternatively, the light gray border may be added around only one of the objects or only along the adjacent edge between the objects.

FIG. 4B depicts an application of the process for avoiding a gap between overlapping objects of different colors. Referring to FIG. 4B, a gap between overlapping objects of different colors is avoided by adding a light gray border, represented by the striped lines, around one of the objects.

FIG. 4C depicts an application of the process to avoid a gap between an object of one color and a background of a different color. Referring to FIG. 4C, a gap between an object of one color and a background of a different color is avoided by adding together the background, a light gray border, represented by the striped lines, around the edges of the object, and the object itself.

According to the present invention, a process is provided that diminishes the effect of a gap between adjacent different colored objects by adding a border of a light gray component to fill up the gap, making it less noticeable to the human eye. It will be appreciated by those of ordinary skill in the art that the present invention can be embodied in other specific forms without departing from the spirit or essential characteristics thereof. For example, although disclosed with specific reference to its implementation in a printer using a CMYK color space, the invention is equally applicable to other types of color output devices and other color spaces. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A process for producing an image without a gap in between objects in an output device with a characteristic color space, the process including the steps of:

a) receiving image data for output, b) determining if the image contains two adjacent uniform color objects, each uniform color composed of two or fewer characteristic color components, wherein if the two adjacent objects do each comprise a uniform color with two or fewer characteristic color components, a light gray component is calculated and added as a border around the objects, and c) processing and outputting the image data.

2. The process of claim 1, wherein if the two adjacent objects do not each comprise a uniform color with two or fewer characteristic color components, the image is not adjusted.

3. A process for producing an image without a gap in between objects in an output device with a characteristic color space, the process including the steps of:

a) receiving image data for output, b) determining if the image represented by the data contains two adjacent uniform color objects, each uniform color composed of two or fewer characteristic color components, (c) if the two adjacent objects each comprises a uniform color with two or fewer characteristic color components, calculating a light gray component by determining saturations of the characteristic color components in one of the objects, and adding a small percentage of the saturation of each of the characteristic color components in the one object together, adding a border comprised of said light gray component around the objects, and processing and outputting the image data.

4. The process of claim 3, wherein the small percentage is up to 30%.

5. The process of claim 1, wherein step b) includes the step of determining if a gap would be evident between the adjacent uniform objects, and calculating and adding the light gray component only if it is determined that the gap would be evident.

6. An image processor comprising:

means for receiving image data;

means, coupled to said receiving means, for determining if the image contains two adjacent uniform color objects, each uniform color composed of two or fewer characteristic color components, and if the two adjacent objects do each comprise a uniform color with two or fewer characteristic color components, calculating a light gray component and adding the light gray component as a border around the objects, and processing the image data; and means, coupled to said determining means, for converting the processed image data into output data.

7. The image processor of claim 6, wherein if the two adjacent objects do not each comprise a uniform color with two or fewer characteristic color components, the determining means does not adjust the image.

8. An image processor comprising:

means for receiving image data;

means, coupled to said receiving means, for determining if the image contains two adjacent uniform color objects, wherein each uniform color is composed of two or fewer characteristic color components, means for calculating a light gray component by determining saturations of the characteristic color components in one of the objects and adding a small percentage of the saturation of each of the characteristic color components in the one object together, means for adding the light gray component as a border around the objects, and for processing the image data; and means, coupled to said adding and processing means, for converting the processed image data into output data.

9. The image processor of claim 8, wherein the small percentage is up to 30%.

10. The image processor of claim 6, wherein the determining means determines if the image contains two adjacent uniform color objects by determining if a gap would be evident between the adjacent uniform objects and calculating and adding the light gray component only if it is determined that the gap would be evident.

11. A method for generating an image which contains two objects adjacent one another, comprising the steps of:

examining data which describes the image to determine whether two adjacent objects are each comprised of a respective uniform color that is composed of two or fewer characteristic color components of a characteristic color space;

determining saturation values for each of the characteristic color components in the uniform color of one of the objects, and calculating a light gray color composed of a percentage of the saturation value of each of the characteristic color components for said one object;

adding a border of said light gray color to an edge of said one object which is adjacent the other object; and generating an image which contains said two adjacent objects including said light gray border.

12. The method of claim 11 wherein said light gray border is added around the periphery of said one object.

13. The method of claim 11 wherein said light gray border is added to edges of both of said objects which are adjacent the other object.

14. The method of claim 11 wherein a first light gray color is calculated with respect to the characteristic color components of said one object, and a second light gray color is calculated with respect to the characteristic color components of the other object, and a border of said second light gray component is added to an edge of said other object.

15. The method of claim 11 further including the step of determining whether a gap is likely to be perceived between the two objects, and performing said determining and adding steps only if a gap is likely to be perceived.

16. The method of claim 15 wherein the determination of whether a gap is likely to be perceived is made by determining whether said uniform colors have a predetermined relationship to one another.

17. The method of claim 16 wherein said relationship is based on whether the uniform colors are contrasting colors.

18. The method of claim 16 wherein said relationship is based on whether one of said uniform colors is a light color.

19. The method of claim 11 wherein said percentage is no greater than 30%.

* * * * *